United States Patent
Sun et al.

(10) Patent No.: US 12,207,195 B2
(45) Date of Patent: Jan. 21, 2025

(54) METHOD FOR RECEIVING POWER SAVING SIGNAL, METHOD FOR TRANSMITTING POWER SAVING SIGNAL, AND RELATED DEVICE

(71) Applicant: VIVO MOBILE COMMUNICATION CO., LTD., Guangdong (CN)

(72) Inventors: Yanliang Sun, Guangdong (CN); Kai Wu, Guangdong (CN); Li Chen, Guangdong (CN); Xueming Pan, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 477 days.

(21) Appl. No.: 17/702,122

(22) Filed: Mar. 23, 2022

(65) Prior Publication Data

US 2022/0217634 A1    Jul. 7, 2022

Related U.S. Application Data

(63) Continuation of application No. PCT/CN2020/116458, filed on Sep. 21, 2020.

(30) Foreign Application Priority Data

Sep. 24, 2019   (CN) .......................... 201910906938.2

(51) Int. Cl.
*H04W 52/02* (2009.01)
*H04B 7/06* (2006.01)
(Continued)

(52) U.S. Cl.
CPC ...... *H04W 52/0229* (2013.01); *H04B 7/0695* (2013.01); *H04L 5/0051* (2013.01); *H04W 74/0833* (2013.01); *H04W 76/19* (2018.02)

(58) Field of Classification Search
CPC .... H04B 7/0695; H04L 5/0051; H04W 16/28; H04W 52/0229; H04W 74/0833; H04W 76/19; Y02D 30/70
See application file for complete search history.

(56) References Cited

U.S. PATENT DOCUMENTS

2019/0159280 A1   5/2019  Chakraborty et al.
2020/0059345 A1   2/2020  Pelletier et al.
(Continued)

FOREIGN PATENT DOCUMENTS

CN    109923819 A    6/2019
CN    111600692 A    8/2020
(Continued)

OTHER PUBLICATIONS

CATT, "Power saving signal/channel design and performance", 3GPP TSG RAN WG1 Meeting #98Bis, R1-1910353, Chongqing, China, Oct. 14-20, 2019.
(Continued)

*Primary Examiner* — Awet Haile
(74) *Attorney, Agent, or Firm* — Price Heneveld LLP

(57) ABSTRACT

A method for receiving a power saving signal, a method for transmitting a power saving signal, and a related device are provided. The method includes: in a case that a beam failure is detected, transmitting a random access request; and after the random access request is transmitted and before a transmission control indication TCI state is updated, performing detection for a power saving signal in a recovery search space based on a first quasi co-location QCL relationship, where the first QCL relationship is a QCL relationship of beam failure recovery reference signals BFR-RS.

20 Claims, 7 Drawing Sheets

(51) Int. Cl.
*H04L 5/00* (2006.01)
*H04W 74/08* (2024.01)
*H04W 74/0833* (2024.01)
*H04W 76/19* (2018.01)

(56) References Cited

U.S. PATENT DOCUMENTS

| | | | | |
|---|---|---|---|---|
| 2020/0128497 | A1* | 4/2020 | Lee | H04L 41/0803 |
| 2021/0058906 | A1* | 2/2021 | Seo | H04W 72/23 |
| 2021/0235292 | A1* | 7/2021 | Zhang | H04B 7/0695 |
| 2022/0060302 | A1* | 2/2022 | Zhang | H04W 76/19 |
| 2022/0103227 | A1* | 3/2022 | Lee | H04W 76/19 |

FOREIGN PATENT DOCUMENTS

| | | |
|---|---|---|
| WO | 2019051487 A1 | 3/2019 |
| WO | 2019124983 A1 | 6/2019 |

OTHER PUBLICATIONS

Nokia, "PDCCH-based power saving signal/channel", 3GPP TSG RAN WG1 meeting #97, R1-1907375, Reno, USA, May 13-May 17, 2019.

Nokia, Nokia Shanghai Bell, Remaining Details on Beam Recovery, 3GPP TSG-RAN WG1 Meeting #92, R1-1802557, Feb. 26-Mar. 2, 2018, Athens, Greece.

Huawei, Hisilicon, Summary of remaining issues on beam failure recovery, 3CPP TSC RAN WCI Meeting #92bis, RI-1803637, Apr. 16-20, 2018, Sanya, China.

Samsung, PDCCH-based power saving signal/channel, 3GPP TSG RAN WG1 #98, R1-1908505, Aug. 26-30, 2019, Prague, CZ.

Sony, Resubmission of R2-1807787, Beam failure detection and maintenance, 3GPP TSG RAN WG2 AH-1807 Meeting, R2-1810119, Jul. 2-6, 2018, Montreal, Canada.

Nokia, Nokia Shanghai Bell, On the RAN2 aspects on power signal/channel for wake-up, FS_NR_UE_pow_sav—Release 16, 3GPP TSG-RAN WG2 Meeting #106, R2-1906700, May 13-17, 2019, Reno, USA.

Mediatek Inc., "Discussion on SSB-based RLM tests", 3GPP TSG-RAN WG4 Meeting #88-8IS, R4-1812513, Chengdu, China, Oct. 8-12, 2018.

Mediatek Inc., "Discussion on SSB-based RLM tests", 3GPP TSG-RAN WG4 Meeting #88, R4-1810245, Gothenburg, SE, Aug. 20-24, 2018.

CATT, "Remaining details on beam failure recovery", 3GPP TSG RAN WG1 Meeting #92bis, R1-1803745, Sanya, China, Apr. 16-20, 2018.

* cited by examiner

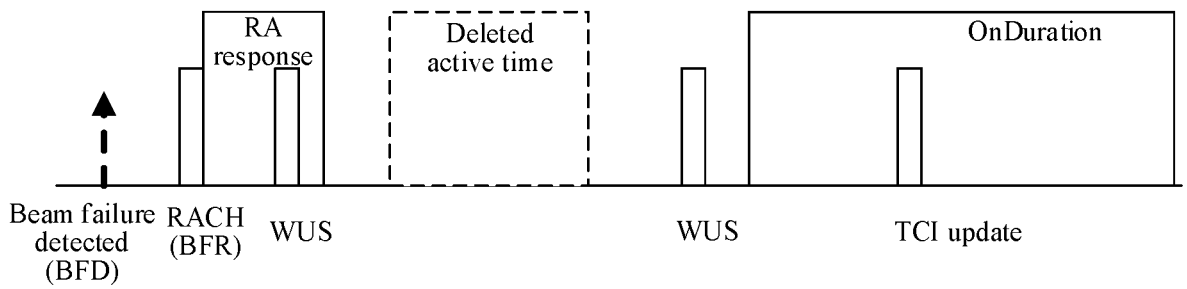
FIG. 6e
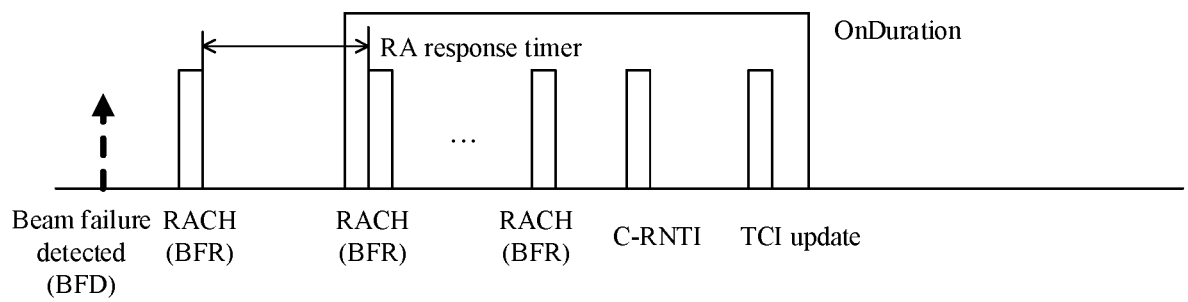
FIG. 6f
In a case that a random access request is received at a random access occasion, transmit a power saving signal in a recovery search space ⟵ 701
FIG. 7

METHOD FOR RECEIVING POWER SAVING SIGNAL, METHOD FOR TRANSMITTING POWER SAVING SIGNAL, AND RELATED DEVICE

CROSS-REFERENCE TO RELATED APPLICATIONS

This application is a continuation application of International Application No. PCT/CN2020/116458 filed on Sep. 21, 2020, which claims priority to Chinese Patent Application No. 201910906938.2, filed in China on Sep. 24, 2019, which are incorporated herein by reference in their entireties.

TECHNICAL FIELD

This disclosure relates to the field of communications technologies, and in particular, to a method for receiving a power saving signal, a method for transmitting a power saving signal, and a related device.

BACKGROUND

In a connected mode, according to service characteristics of user equipment (UE) (also called terminal device), discontinuous reception (Discontinuous RX, DRX), that is, connected mode DRX (C-DRX), may be configured for the UE to reduce power consumption of the UE. Currently, before OnDuration of each DRX, the UE may determine, by receiving a power saving signal or a wake-up signal (WUS), whether to wake up the OnDuration. In a case that the OnDuration is woken up, the UE monitors scheduling information on a control channel in the OnDuration, and then performs data transmission or reception. In a case that the OnDuration is sleeping, the UE does not monitor scheduling information on a control channel in the OnDuration, and then performs data transmission or reception. Therefore, it is important for a network side and a UE side to have consistent understanding of transmission and reception of the power saving signal.

However, in the related art, in a case that quality of a beam signal used for transmission of a power saving signal is poor, reception performance of the power saving signal is usually poor, which easily leads to inconsistent understanding of the transmission and reception of the power saving signal on a network side and a UE side.

SUMMARY

Embodiments of this disclosure provide a method for receiving a power saving signal, a method for transmitting a power saving signal, and a related device.

According to a first aspect, an embodiment of this disclosure provides a method for receiving a power saving signal, applied to a terminal device, where the method includes:

in a case that a beam failure is detected, transmitting a random access request; and after the random access request is transmitted and before a transmission control indication TCI state is updated, performing detection for a power saving signal in a recovery search space based on a first quasi co-location QCL relationship, where the first QCL relationship is a QCL relationship of beam failure recovery reference signals BFR-RS.

According to a second aspect, an embodiment of this disclosure further provides a method for transmitting a power saving signal, applied to a network-side device, where the method includes:

in a case that a random access request is received at a random access occasion, transmitting a power saving signal in a recovery search space, where the random access occasion has a QCL relationship with a beam failure recovery reference signal BF-R-RS, and the power saving signal has a QCL relationship with the BFR-RS.

According to a third aspect, an embodiment of this disclosure further provides a terminal device, where the terminal device includes:

a first transmitting module, configured to, in a case that a beam failure is detected, transmit a random access request; and a first detection module, configured to, after the random access request is transmitted and before a transmission control indication TCI state is updated, perform detection for a power saving signal in a recovery search space based on a first quasi co-location QCL relationship, where the first QCL relationship is a QCL relationship of beam failure recovery reference signals BFR-RS.

According to a fourth aspect, an embodiment of this disclosure further provides a network-side device, where the network-side device includes:

a first transmitting module, configured to, in a case that a random access request is received at a random access occasion, transmit a power saving signal in a recovery search space, where the random access occasion has a QCL relationship with a beam failure recovery reference signal BF-R-RS, and the power saving signal has a QCL relationship with the BFR-RS.

According to a fifth aspect, an embodiment of this disclosure further provides a terminal device, including a processor, a memory, and a computer program stored in the memory and capable of running on the processor, where when the computer program is executed by the processor, the steps of the method for receiving a power saving signal according to the first aspect are implemented.

According to a sixth aspect, an embodiment of this disclosure further provides a network-side device, including a processor, a memory, and a computer program stored in the memory and capable of running on the processor, where when the computer program is executed by the processor, the steps of the method for transmitting a power saving signal according to the second aspect are implemented.

According to a seventh aspect, an embodiment of this disclosure further provides a computer-readable storage medium, where the computer-readable storage medium stores a computer program, and when the computer program is executed by a processor, the steps of the method for receiving a power saving signal according to the first aspect are implemented, or the steps of the method for transmitting a power saving signal according to the second aspect are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may still derive other drawings from these accompanying drawings.

FIG. 6e is a fifth schematic diagram of transmitting a WUS based on a BFR procedure according to an embodiment of this disclosure;

FIG. 6f is a sixth schematic diagram of transmitting a WUS based on a BFR procedure according to an embodiment of this disclosure;

FIG. 7 is a flowchart of a method for transmitting a power saving signal according to an embodiment of this disclosure;

DESCRIPTION OF EMBODIMENTS

Figure 1A:
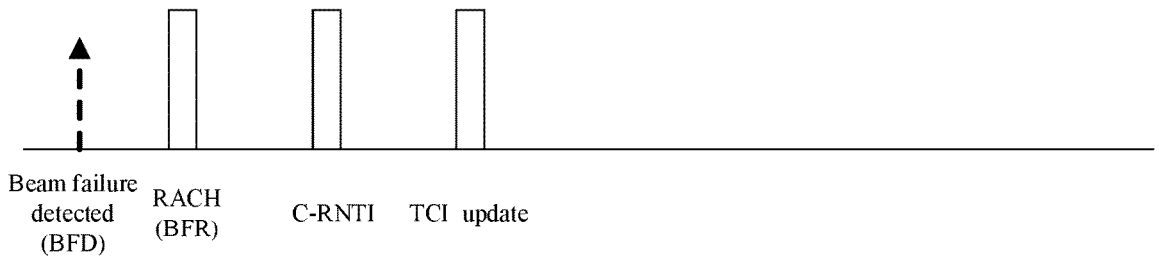
FIG. 1a is a first schematic diagram of beam failure recovery according to an embodiment of this disclosure.

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by persons of ordinary skill in the art based on the embodiments of this disclosure without creative efforts shall fall within the protection scope of this disclosure.

The terms "first", "second", and the like in this specification and claims of this application are used to distinguish between similar objects instead of describing a specific order or sequence. It should be understood that the data termed in such a manner are interchangeable in proper cases so that the embodiments of this application can be implemented in other orders than the order illustrated or described in this application. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device. In addition, "and/or" used in this specification and claims indicates at least one of the connected objects. For example, "A and/or B and/or C" represents the following seven cases: only A; only B; only C; both A and B; both B and C; both A and C; and all A, B, and C.

For ease of understanding, the following describes some content related to the embodiments of this disclosure.

Transmission configuration indication (TCI) state:

In an application scenario with a plurality of beams in downlink, for example, a millimeter wave, when a network configures a control resource set (CORESET), the network configure a set of TCI states, that is, a set of beam information, and then activates one of the plurality of TCI states through a MAC control element (CE) or downlink control information (DCI). A maximum of three CORESETs may be configured for a power saving signal (or called a WUS), which means that up to three active TCI states may be present. However, the network is likely not to activate too many states, for example, only activating one or two states, in view of reducing signaling overheads and UE detection overheads.

Beam Failure Recovery (BFR) Technology:

According to a new radio (NR) protocol in Release 15 (Release 15, R15), there are no more than two reference signal (RS) resources used for BFR. UE uses the RS resource(s) for the BFR to monitor radio link quality in beam dimension. When the link quality is continuously lower than a threshold, a physical layer of the UE reports a beam failure to a media access control (MAC) layer, and the MAC layer starts a beamFailureDetectionTimer timer, which is restarted upon each beam failure reporting. In addition, each beam failure reporting will increase a value of a BFI_COUNTER register by 1. If the timer expires, the BFI_COUNTER register for beam failure reporting will be reset to zero. If a value of the register exceeds beamFailureInstanceMaxCount, the UE considers that a beam failure is detected (BFD), and starts a beam recovery procedure.

Figure 1B:
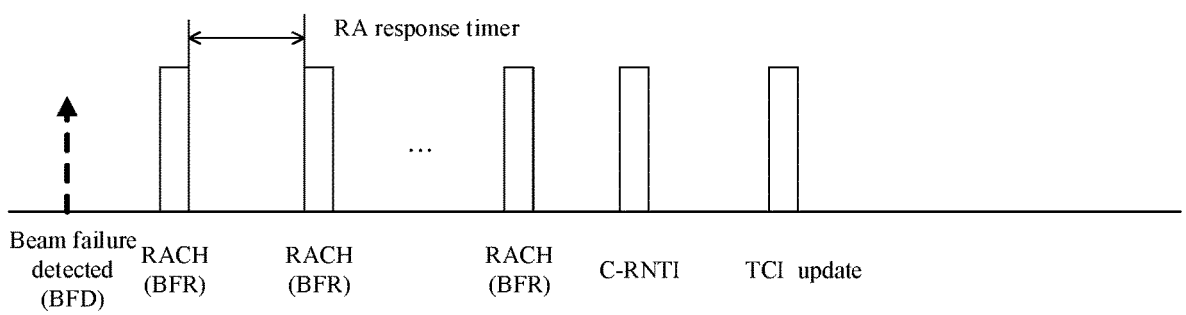
FIG. 1b is a second schematic diagram of beam failure recovery according to an embodiment of this disclosure.
Figure 1C:
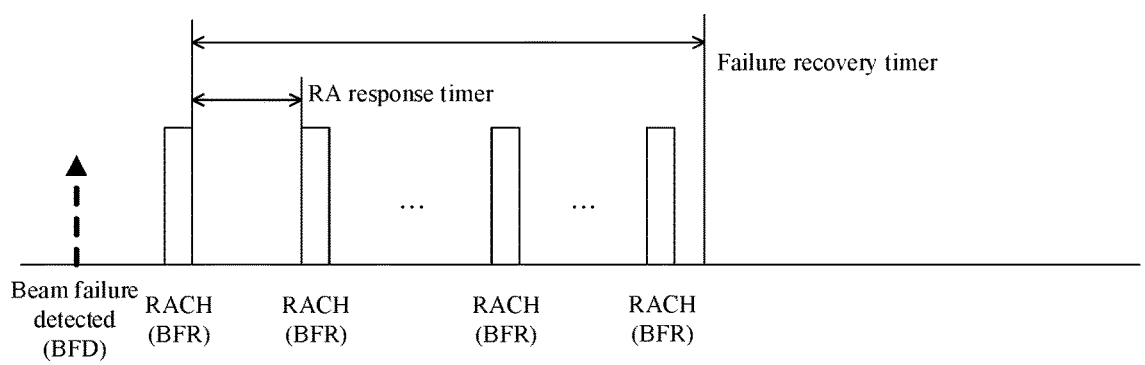
FIG. 1c is a third schematic diagram of beam failure recovery according to an embodiment of this disclosure.

In the beam recovery procedure, the UE needs to transmit a random access request (that is, RACH) to notify the network side that beam switching has occurred, and starts a FailureRecovery timer and an RA response timer. The UE then performs beam search in a search space (SS) configured by the network for beam failure recovery, to obtain further response information from the network. The response information may be a cell radio network temporary identity (C-RNTI), as shown in FIG. 1a. If the UE receives no C-RNTI after the RA response timer expires, the UE may increase power before transmitting the RACH, as shown in FIG. 1b. If the UE has received the C-RNTI, the UE stops the FailureRecovery timer. If the UE receives no response information after the FailureRecovery timer expires, the UE no longer transmits the RACH and waits for radio link monitoring (RLM) to trigger a radio link failure, as shown in FIG. 1c.

When there is DRX, according to the definition in the R15 protocol, the UE may not perform beam failure monitoring or beam recovery RACH transmission in inactive time. The UE may perform beam failure monitoring and beam recovery RACH transmission only within DRX OnDuration (that is, Active Time). In addition, it should be noted that the response information of the network is carried by the C-RNTI, and such C-RNTI may be received outside the active time, that is, is not limited by the active time, but must be received within an RA response time window (that is, before the RA response timer expires).

Figure 2:
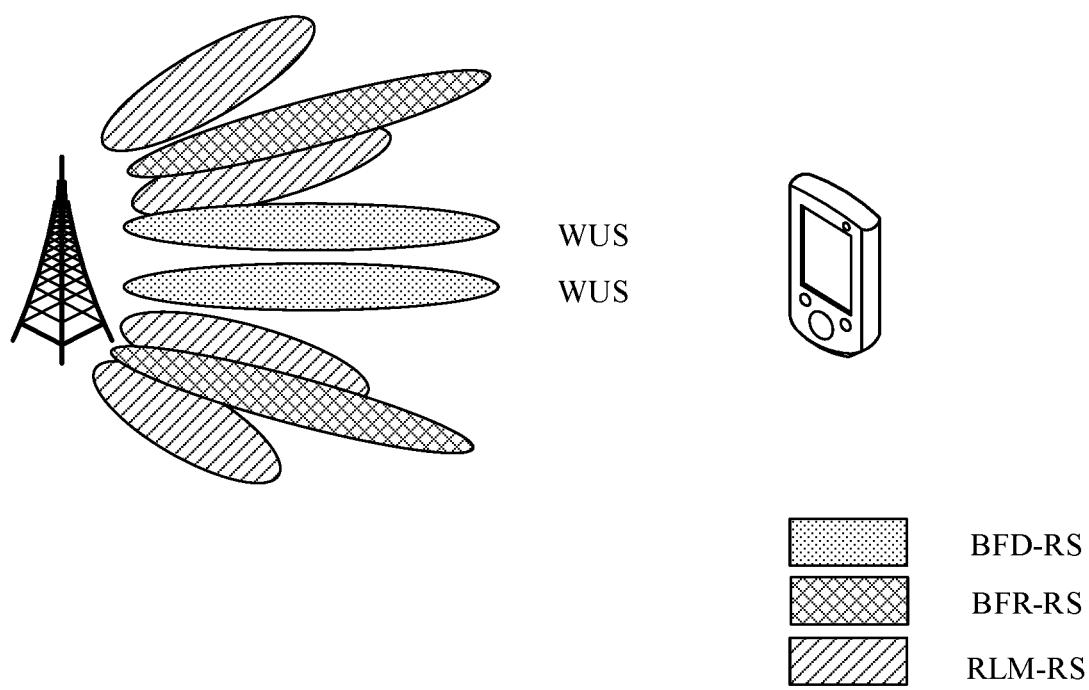
FIG. 2 is a schematic diagram of transmission of a WUS according to an embodiment of this disclosure.

BFR is used for maintaining beam information for the UE to receive a PDCCH. If the network does not configure a BI-D-RS, the UE uses transmission configuration indication (TCI) states of all currently configured control resource sets (CORESET) to determine a current BFD-RS set. TCI state indication is actually quasi co-location (QCL) indication. This quasi co-location relationship indicates that two signals are quasi-co-located, meaning that the two signals are transmitted from the same group of ports and may be assumed to have some identical parameters upon reception. Therefore, the TCI states of all the CORESETs for the UE need to have a QCL relationship with at least one of the configured BFD-RSs. However, from a general network implementation logic, it may be considered that the network needs to use BFR to maintain an active beam. For example, as shown in FIG. 2, a WUS is transmitted only on a beam corresponding to a BFD-RS.

CORESET and SS (that is, SearchSpace) configurations in NR R15:

CORESET is defined in the NR, in which the CORESET is a set of time-frequency resources used for carrying control information. This configuration determines patterns of time-frequency resources in each slot. One QCL relationship may be configured for a CORESET, to indicate a beam used by the network to transmit the CORESET.

Figure 3:
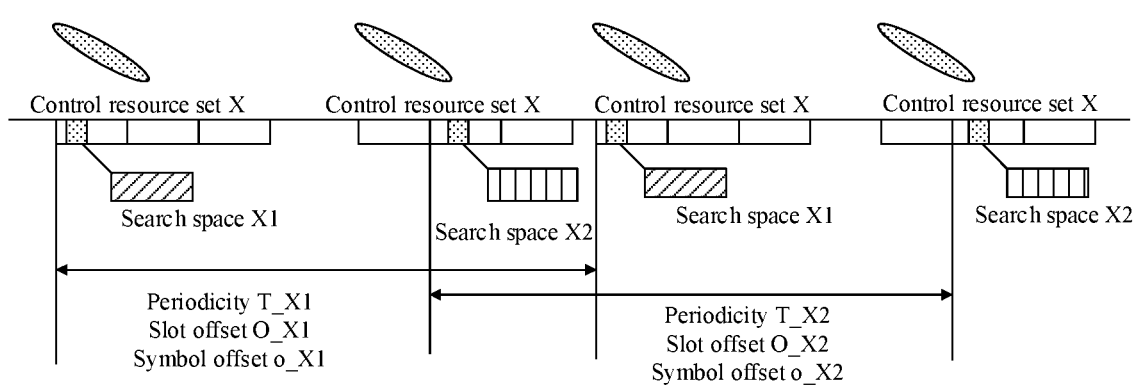
FIG. 3 is a schematic diagram of a control resource set and a search space according to an embodiment of this disclosure.

Further, a series of SSs may be configured for each UE. Each SS has a corresponding CORESET and has a separately configured periodicity, slot offset, and symbol offset, as shown in FIG. 3. There may be a plurality of SSs in one CORESET.

Figure 4:
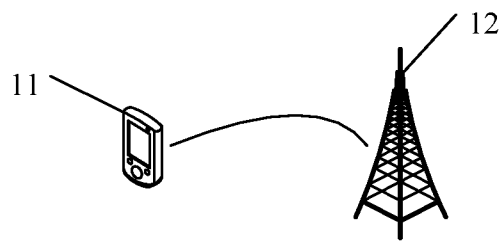
FIG. 4 is a structural diagram of a network system to which an embodiment of this disclosure may be applied.

Referring to FIG. 4, FIG. 4 is a structural diagram of a network system to which an embodiment of this disclosure may be applied. As shown in FIG. 4, the network system includes a terminal device 11 and a network-side device 12. The terminal device 11 may be a user-side device such as a mobile phone, a tablet computer, a laptop computer, a personal digital assistant (PDA), a mobile Internet device (MID), or a wearable device. It should be noted that a specific type of the terminal device 11 is not limited in the embodiments of this disclosure. The network-side device 12 may be a base station, for example, a macro base station, an LTE eNB, a 5G NR NB, or a gNB. The network-side device 12 may alternatively be a small cell, for example, a low power node (LPN), a pico cell, or a femto cell, or the network-side device 12 may be an access point (AP). The base station may alternatively be a network node formed by a central unit (CU) and a plurality of TRPs managed and controlled by the central unit. It should be noted that a specific type of the network-side device 12 is not limited in the embodiments of this disclosure.

The terminal device 11 may be used to execute the method for receiving a power saving signal provided in the embodiments of this disclosure, and the network-side device 12 may be used to execute the method for transmitting a power saving signal provided in the embodiments of this disclosure.

Figure 5:
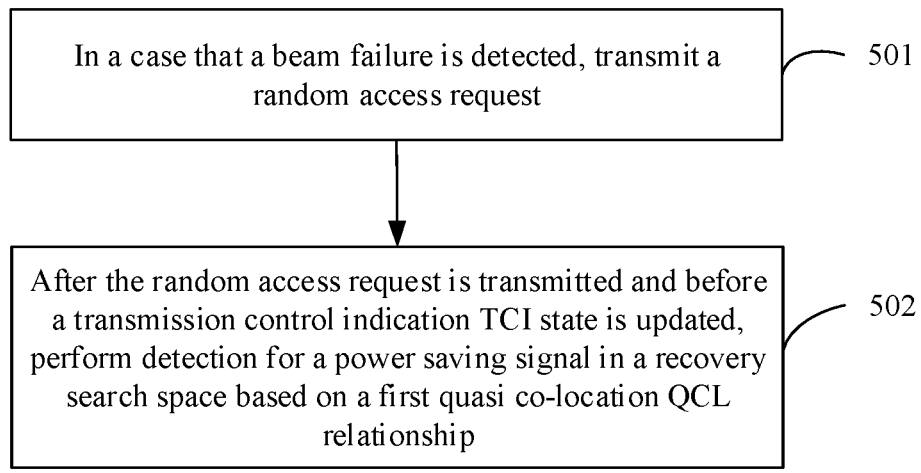
FIG. 5 is a flowchart of a method for receiving a power saving signal according to an embodiment of this disclosure.

An embodiment of this disclosure provides a method for receiving a power saving signal, applied to a terminal device. Referring to FIG. 5, FIG. 5 is a flowchart of the method for receiving a power saving signal according to this embodiment of this disclosure. As shown in FIG. 5, the method includes the following steps.

Step 501: In a case that a beam failure is detected, transmit a random access request.

In this embodiment, before a power saving signal is received, in a case that the beam failure is detected, a beam failure recovery (that is, BFR) procedure is started to perform beam switching. To be specific, in a case that the beam failure is detected, the random access request (that is, RACH) is transmitted to perform beam failure recovery.

Step 502: After the random access request is transmitted and before a transmission control indication TCI state is updated, perform detection for a power saving signal in a recovery search space based on a first quasi co-location QCL relationship, where the first QCL relationship is a QCL relationship of beam failure recovery reference signals (BFR-RS), or a QCL relationship of a CORESET corresponding to the recovery search space.

In this embodiment, the recovery search space may refer to a search space used for beam failure recovery. The BFR-RS may refer to a reference signal used for beam failure recovery. The first QCL relationship may be a QCL relationship between the power saving signal and the BFR-RS. For example, the network-side device may pre-configure the BFR-RSs; after being identified by UE as RSs that may be used for beam recovery, the BFR-RSs automatically become the QCL relationship used for performing detection for the power saving signal. To be specific, when the UE detects the power saving signal, it is assumed that the power saving signal has a QCL relationship with the BFR-RSs, for example, the UE may use a same receive beam for detection.

It should be noted that, after the BFR-RS is identified by the UE as an RS that may be used for beam recovery, the BFR-RS automatically has a QCL relationship used for performing detection for a power saving signal. In this case, the network-side device may transmit a power saving signal in the recovery search space, in which case the actually transmitted power saving signal has a QCL relationship with the BFR-RS; or the network-side device may not transmit a power saving signal in the recovery search space, in which case the actually transmitted power saving signal does not have a QCL relationship with the BFR-RS.

In this step, after the random access request is transmitted and before the TCI state is updated, the UE may expect that the network-side device will transmit in the recovery search space a power saving signal that has a QCL relationship with the BFR-RS, so that the UE can perform detection for the power saving signal in the recovery search space based on the QCL relationship between the BFR-RS.

Figure 6A:
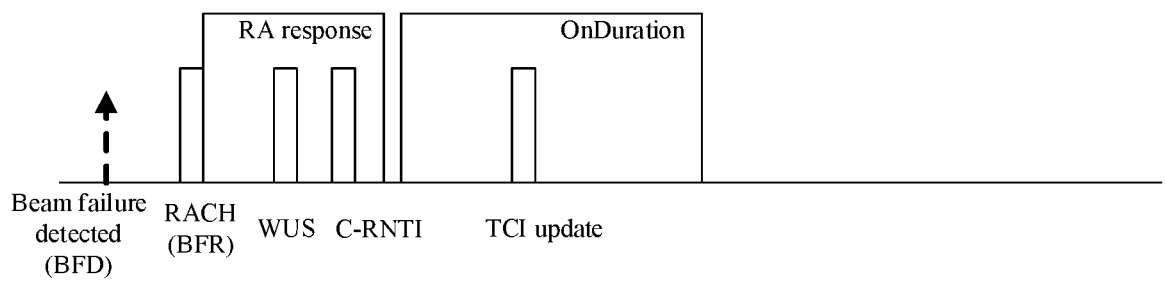
FIG. 6a is a first schematic diagram of transmitting a WUS based on a BFR procedure according to an embodiment of this disclosure.
Figure 6B:
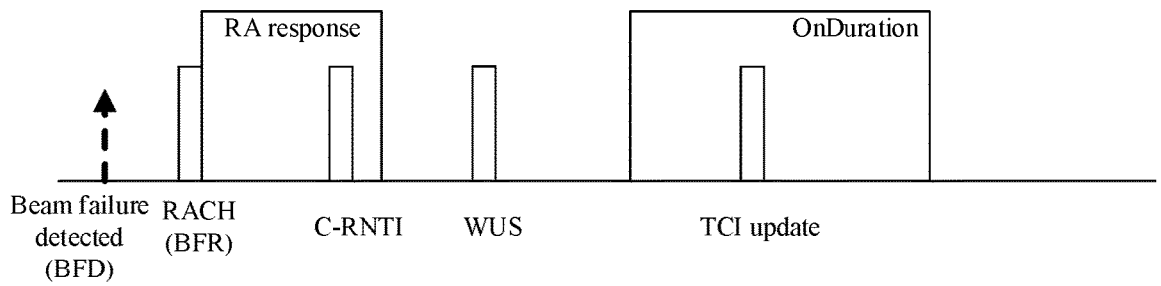
FIG. 6b is a second schematic diagram of transmitting a WUS based on a BFR procedure according to an embodiment of this disclosure.

For example, referring to FIG. 6a and FIG. 6b, in the case of beam failure detected, the transmission of the RACH is triggered, and detection for a C-RNTI is performed within an RA response time window. The UE may perform detection for a WUS in the recovery search space based on the QCL relationship of the BFR-RSs within the RA response time window before the C-RNTI is detected, as shown in FIG. 6a; or may perform detection for a WUS in the recovery search space based on the QCL relationship of the BFR-RSs outside the RA-response time window, as shown in FIG. 6b.

It should be noted that, in this embodiment, the power saving signal may be used only to determine whether to wake up in onduration; or may be used only to determine whether the beam recovery is completed; or may be used both to determine whether the beam recovery is completed and determine whether to wake up in OnDuration.

With the method for receiving a power saving signal according to this embodiment of this disclosure, in a case that the beam failure is detected, the random access request is transmitted; and after the random access request is transmitted and before the transmission control indication TCI state is updated, detection for the power saving signal is performed in the recovery search space based on the QCL relationship of the BFR-RSs. The power saving signal is transmitted in the beam failure recovery procedure, so that reception performance of the power saving signal can be improved in the case of poor beam signal quality, and further, consistency of understanding of the transmission and reception of the power saving signal on a network side and a UE side can be improved.

Optionally, the method may further include:

after the random access request is transmitted and before the TCI state is updated, performing detection for a power saving signal in a first search space based on a second QCL relationship, where the first search space is a search space for power saving signal transmission, the first search space is different from the recovery search space, and the second QCL relationship is a QCL relationship configured on a control resource set CORESET corresponding to the first search space.

In this embodiment, the first search space may be any search space that is different from the recovery search space and that is used for power saving signal transmission.

In practical application, after the random access request is transmitted and before the TCI state is updated, the UE may perform detection for the power saving signal in the recovery search space based on the QCL relationship of the BFR-RSs, or may perform detection for the power saving signal based on original configuration information (for example, a CORESET, a search space, or a QCL relationship) used for power saving signal transmission, where the original configuration information used for power saving signal transmission may include configuration information used for power saving signal transmission in a case of no beam failure, for example, configuration information for power saving signal transmission in the related art.

In this embodiment, after the random access request is transmitted and before the TCI state is updated, detection for the power saving signal can be performed not only in the recovery search space, but also in the first search space, which can further improve reception performance of the power saving signal.

Optionally, the performing detection for a power saving signal in a recovery search space based on a first quasi co-location QCL relationship may include:

performing detection for the power saving signal in the recovery search space based on the first QCL relationship from a second occasion, where the second occasion is at least a first preset gap later than a first occasion, and the first occasion is a transmit occasion of the random access request.

In this embodiment, the first preset gap may be preset duration, for example, X1 milliseconds; or may be a preset number of slots, for example, X2 slots. Values of X1 and X2 may be configured by the network side, or may be predefined by a protocol. For example, X1 may be predefined as 1, 2, 3, 4, or the like, and X2 may be predefined as 1, 2, 3, 4, or the like.

In an actual case, a random access response of the network side usually takes a period of time, and therefore detection for the power saving signal in the recovery search space may start from the first preset gap after the transmit occasion of the random access request, so as to reduce some invalid detections and save system resources. Correspondingly, the receive occasion of the power saving signal is at least a preset gap later than the transmit occasion of the random access request.

In this embodiment, detection for the power saving signal is performed in the recovery search space based on the first QCL relationship from a second occasion, which can reduce some invalid detections and save system resources.

Optionally, the method may further include:

in a case that the power saving signal is detected in the recovery search space, performing at least one of resetting a value of a beam failure counter to zero and stopping a failure recovery timer.

In this embodiment, in a case that the power saving signal is detected in the recovery search space, the value of the beam failure counter (that is, BFI_COUNTER) may be reset to zero, and/or the failure recovery timer may be stopped, with no need to continue to perform detection for the C-RNTI to determine whether the beam recovery is completed. This can save resources.

Figure 6C:
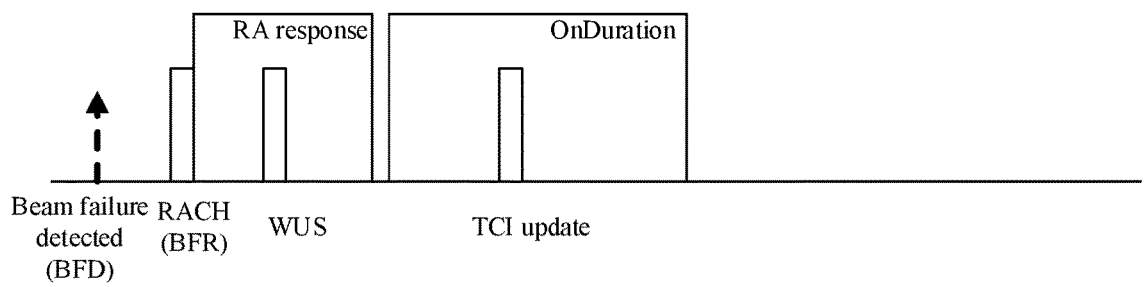
FIG. 6c is a third schematic diagram of transmitting a WUS based on a BFR procedure according to an embodiment of this disclosure.

For example, referring to FIG. 6c, in a case that a WUS is detected in the recovery search space within the RA response time window, the value of BFI_COUNTER may be reset to zero, and the FailureRecovery timer may be stopped without performing detection for the C-RNTI.

Optionally, in this embodiment, after the random access request is transmitted, detection for the C-RNTI may be performed in the RA response time window. If the C-RNTI is detected before the power saving signal is detected in the recovery search space, it may be determined, according to the C-RNTI, that the beam recovery is completed, that is, the value of BFI_COUNTER is reset to zero, and/or the FailureRecovery timer is stopped.

It should be noted that, in this embodiment, the power saving signal may be used only to determine whether the beam recovery is completed; or may be used to determine whether the beam recovery is completed and determine whether to wake up in OnDuration.

Optionally, the method may further include:

after the transmitting a random access request, waking up in OnDuration.

In this embodiment, the UE may be woken up in OnDuration after the random access request is initiated due to the beam failure, that is, the UE is woken up in the OnDuration regardless of whether a power saving signal is detected, so that the OnDuration is woken up based on the random access request, and understanding of a status of the OnDuration is kept consistent on both the UE side and the network side. It should be noted that the waking up the OnDuration can be understood as waking up the OnDuration at an upcoming OnDuration occasion defined by a DRX. cycle.

In this embodiment, the UE may not consider that the network side will not transmit, after the random access request is transmitted, a power saving signal to indicate the UE to sleep, or that the network will transmit a power saving signal and indicate sleeping in the power saving signal.

It should be noted that, in this embodiment, the power saving signal may be used to determine whether the beam recovery is completed.

Optionally, the method may further include at least one of the following:

in a case that the power saving signal is detected, transmitting first feedback information; and in a case that no power saving signal is detected, transmitting second feedback information.

In this embodiment, the first feedback information and second feedback information may be any different feedback information. For example, the first feedback information may be ACK information, and the second feedback information may be NACK information.

In this embodiment, in a case that the power saving signal is detected, the first feedback information is transmitted to the network-side device; and in a case that no power saving signal is detected, the second feedback information is transmitted to the network-side device, so that the network-side device can know a reception status of the power saving signal by the UE, so as to improve consistency of understanding of transmission and reception of the power saving signal on the network side and the UE side.

Optionally, the method may further include:

in a case that no power saving signal is detected, waking up in the OnDuration and continuing to transmit the random access request.

In this embodiment, that no power saving signal is detected may be understood as that the UE does not detect a power saving signal in the recovery search space when the UE only performs detection for a power saving signal in the recovery search space.

Optionally, the UE may not consider that after the random access request is transmitted, the network side will not transmit a power saving signal to indicate the UE to sleep. Therefore, if the UE does not receive the power saving signal, it is considered that the power saving signal may be missed or the RACH network does not receive the power saving signal properly, and the UE may automatically wake up in the OnDuration and continue to transmit the RACH to the network-side device. The OnDuration may refer to OnDuration targeted for the power saving signal detection. For example, detection for the power saving signal is performed before first OnDuration, that is, the OnDuration targeted for the power saving signal detection is the first OnDuration, the UE may be woken up in the first OnDuration in a case that no power saving signal is detected.

Figure 6D:
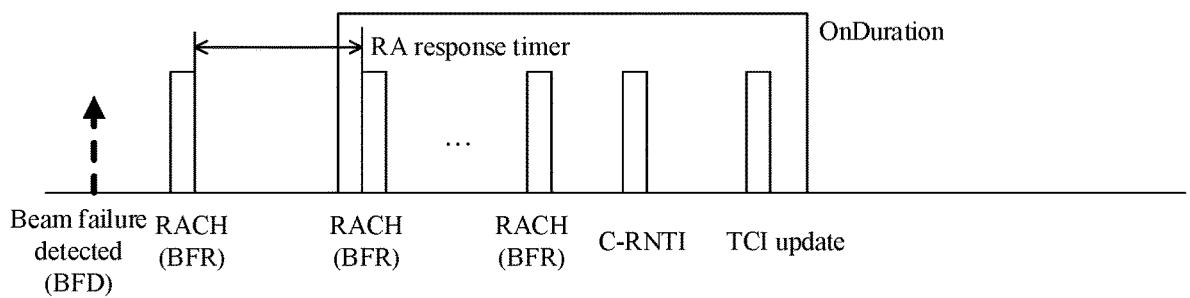
FIG. 6d is a fourth schematic diagram of transmitting a WUS based on a BFR procedure according to an embodiment of this disclosure.

For example, as shown in FIG. 6d, in a case that no WUS is detected before an OnDuration, the UE automatically wakes up in the OnDuration, and continues to transmit the RACH until the C-RNTI is received.

It should be noted that the waking up in the OnDuration can be understood as waking up in the OnDuration at an upcoming OnDuration occasion defined by a DRX cycle.

Optionally, the method may further include:

in a case that the UE is woken up in the OnDuration, monitoring a control signal in the OnDuration.

In this embodiment, in a case that the UE is woken up in the OnDuration, in addition to continuing to transmit the random access request, control signal monitoring may also be performed in the woken-up OnDuration. For example, the UE may monitor the control signal based on original configuration information (for example, CORESET and SearchSpace) used for control signal monitoring, where the original configuration information used for control signal monitoring may include configuration information used for control signal monitoring in the case of no beam failure, for example, configuration information used control signal monitoring in the related art. It should be noted that the control signal may include a power saving signal.

In this embodiment, in a case that the UE is woken up in the OnDuration, in addition to continuing to transmit the random access request, control signal monitoring may also be performed in the woken-up OnDuration, to improve reception performance of the control signal while ensuring switching to a beam with better signal quality.

Optionally, the method may further include:

in a case that the TCI state is not updated and the detected power saving signal indicates sleeping, continuing to perform detection for the power saving signal in the recovery search space based on the first QCL relationship.

In this embodiment, in a case that the TCI state is not updated and the detected power saving signal indicates sleeping, the OnDuration corresponding to the currently detected power saving signal is hibernated, and detection for a corresponding power saving signal is performed in the recovery search space based on the first QCL relationship before next OnDuration.

For example, as shown in FIG. 6e, in a case that the power saving signal that has been detected before an OnDuration indicates sleeping, the OnDuration is hibernated, and detection for a power saving signal is performed in the recovery search space based on the first QCL relationship before the next OnDuration of the OnDuration, and so on, until the TCI state is updated.

Based on the solution provided in this embodiment, the network-side device may not wake up the UE immediately when there is no service demand and reception performance of the RACH corresponding to the BFR-RS used for beam recovery is better, but may wake up, when there is a service demand, the UE to perform TCI state update while a service is being transmitted. This not only avoids scheduling dedicated to the TCI state update, but also reduces the OnDuration of the UE, thereby reducing network overheads and power consumption of the UE.

Optionally, the method may further include:

in a case that the TCI state is not updated and the detected power saving signal indicates sleeping, continuing to transmit the random access request.

In this embodiment, in a case that the TCI state is not updated and the detected power saving signal indicates sleeping, the random access request may be continued to be transmitted, to notify the network side that a beam needs to be recovered as soon as possible, as shown in FIG. 6f. The network-side device may determine BFR-RS beam specific link quality of the UE based on reception quality of the RACH, and then decide whether to perform beam recovery immediately.

An embodiment of this disclosure further provides a method for transmitting a power saving signal, applied to a network-side device. Referring to FIG. 7, FIG. 7 is a flowchart of the method for transmitting a power saving signal according to this embodiment of this disclosure. As shown in FIG. 7, the method includes the following steps.

Step 701: In a case that a random access request is received at a random access occasion, transmit a power saving signal in a recovery search space, where the random access occasion has a QCL relationship with a beam failure recovery reference signal BFR-RS, and the power saving signal has a QCL relationship with the BFR-RS.

In this embodiment, the network-side device may transmit, in the recovery search space, the power saving signal that has a QCL relationship with the BFR-RS in a case that a random access request for beam failure recovery is received, that is, a random access request is received at a random access occasion that has a QCL relationship with the BFR-RS. In this way, a terminal device may perform detection for the power saving signal in the recovery search space based on the QCL relationship between the BFR-RS and the power saving signal.

In this embodiment, the power saving signal is transmitted in the recovery search space when the random access request is received at the random access occasion, which can improve reception performance of the power saving signal in the case of poor beam signal quality, and also improve consistency of understanding of the transmission and reception of the power saving signal on a network side and a UE side.

Optionally, the method may further include:

transmitting a power saving signal in a first search space based on a second QCL relationship, where the first search space is a search space for power saving signal transmission, the first search space is different from the recovery search space, and the second QCL relationship is a QCL relationship of reference signals corresponding to the first search space.

In this embodiment, the first search space may be any search space that is different from the recovery search space and that is used for power saving signal transmission.

Optionally, in practical application, in a case that the random access request is received at the random access occasion, the network-side device may not only transmit the power saving signal in the recovery search space, but also may transmit the power saving signal based on original configuration information (for example, a CORESET, a search space, or a QCL relationship) used for power saving signal transmission, where the original configuration information used for power saving signal transmission may include configuration information used for power saving signal transmission in the case of no beam failure, for example, configuration information for power saving signal transmission in the related art.

In this embodiment, in a case that the random access request is received at the random access occasion, the power saving signal can be transmitted not only in the recovery search space, but also in the first search space, which can further improve reception performance of the power saving signal.

Optionally, the transmitting a power saving signal in a recovery search space may include:

transmitting the power saving signal in the recovery search space from a third occasion, where the third occasion is at least a second preset gap later than a fourth occasion, and the fourth occasion is a receive occasion of the random access request.

In this embodiment, the receive occasion of the random access request may be an occasion at which a physical layer of the network side receives the random access request, and may be equivalent to the transmit occasion of the random access request. The second preset gap may be preset duration, for example, X1 milliseconds; or may be a preset number of slots, for example, X2 slots. Values of X1 and X2 may be configured by the network side, or may be predefined by a protocol. For example, X1 may be predefined as 1, 2, 3, 4, or the like, and X2 may be predefined as 1, 2, 3, 4, or the like.

In an actual case, after receiving the random access request, the terminal device usually needs to parse the received random access request, and the parsing usually takes some time. Therefore, in this embodiment, the power saving signal can be transmitted in the recovery search space from the second preset gap after the receive occasion of the random access request.

Optionally, the power saving signal is used for indicating to wake up in the OnDuration.

In this embodiment, the power saving signal transmitted by the network-side device to the terminal device is used for indicating to wake up in the OnDuration, that is, the UE does not consider that the power saving signal transmitted by the network side after the random access request is transmitted indicates sleeping.

Optionally, the method may further include one of the following:

receiving first feedback information, where the first feedback information is used for indicating that a terminal device has received the power saving signal; and receiving second feedback information, where the second feedback information is used for indicating that the terminal device has received no power saving signal.

In this embodiment, the first feedback information and second feedback information may be any different feedback information. For example, the first feedback information may be ACK information, and the second feedback information may be NACK information.

In this embodiment, the first feedback information indicating that the terminal device has received the power saving signal is received from the terminal device, or the second feedback information indicating that the terminal device has not received the power saving signal is received from the terminal device, so that the network-side device knows a reception status of the power saving signal by the UE, to improve consistency of understanding of transmission and reception of the power saving signal by the network side and the UE side.

This embodiment of this disclosure is described below with reference to examples.

Referring to FIG. 6a to FIG. 6e, a MAC layer of the UE may determine that in the case of beam failure detected, transmission of a RACH is triggered, and after the RACH is transmitted, detection for a C-RNTI is performed in an RA response time window, that is, before an RA response timer expires.

Optionally, if the WUS (that is, the power saving signal) is within the RA response time window, or the UE has detected the C-RNTI but has not received update of the TCI state, the UE may perform detection for the WUS based on the QCL relationship of the BFR-RSs, as shown in FIG. 6a and FIG. 6b. In this case, the UE may determine, based on that the C-RNTI is received, that the beam recovery is completed, that is, the FailureRecovery timer is stopped.

Optionally, the UE may also perform detection for the WUS based on original configuration information (that is, a CORESET, a Searchspace, or a QCL relationship) used for power saving signal transmission.

Optionally, the RA response time window may be started in X1 milliseconds or X1 slots after the RACH is transmitted. X1 or X2 may be values defined in a protocol, for example, X1 is 4 and X2 is 4.

Optionally, if the WUS is within the RA response time window and the UE has received the WUS, it may be considered that the beam recovery is completed, that is, the BFI_COUNTER is set to 0, and the FailureRecovery timer is stopped. In this case, if there is a WUS detection occasion that falls within the RA response time window, the network does not need to transmit a C-RNTI as a response after transmitting the WUS.

Optionally, the WUS may be physical downlink control channel (PDCCH) information in which ACK/NACK needs to be fed back. For example, the WUS may be downlink control information (DCI) in which ACK/NACK needs to be fed back.

Optionally, the UE considers that after the RACH is transmitted, the network side will definitely transmit the WUS, and will not indicate the UE to sleep by not transmitting the WUS. Therefore, if the UE does not receive the WUS, the UE considers that the WUS is missed, or that the RACH network does not receive the WUS properly, the UE automatically enters an active time in an OnDuration of a next DRX cycle, and performs control signal monitoring within the active time. Additionally, the UE may transmit the RACH each time when the RA response timer expires, as shown in FIG. 6d.

Optionally, if the UE assumes that the WUS transmitted by the network side indicates the UE to sleep, and the TCI state is not updated, the UE may still perform detection for the WUS in the RecoverySearchSpace based on the QCL relationship of the BFR-RSs before the OnDuration of the next DRX is woken up, as shown in FIG. 6e.

Optionally, for the case that the WUS indicates sleeping, the UE may transmit an RACH again before a next WUS arrives, to prompt the network that beam information needs to be updated, as shown in FIG. 6f.

In addition, it can be predefined in the protocol that after the UE transmits the RACH and before the TCI state is updated, if there is a receive occasion of the WUS, the UE considers that the WUS will not indicate the UE to sleep.

To sum up, in this embodiment of this disclosure, the WUS is transmitted in the BFR procedure, which can reduce configuration of the CORESET and QCL relationship for the WUS and reduce network overheads, while ensuring the reception performance of the WUS.

Figure 8:
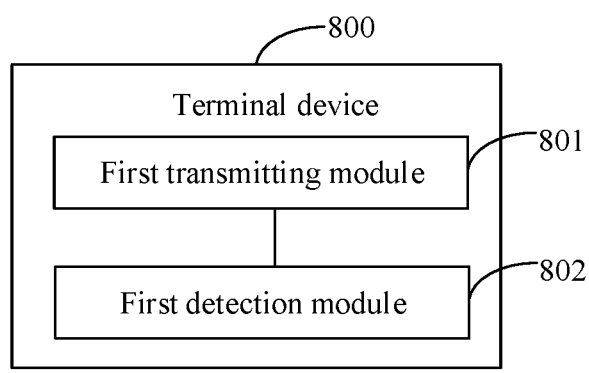
FIG. 8 is a structural diagram of a terminal device according to an embodiment of this disclosure.

Referring to FIG. 8, FIG. 8 is a structural diagram of a terminal device according to an embodiment of this disclosure. As shown in FIG. 8, the terminal device 800 includes:

a first transmitting module 801, configured to, in a case that a beam failure is detected, transmit a random access request; and a first detection module 802, configured to, after the random access request is transmitted and before a transmission control indication TCI state is updated, perform detection for a power saving signal in a recovery search space based on a first quasi co-location QCL relationship, where the first QCL relationship is a QCL relationship of beam failure recovery reference signals BFR-RS.

Optionally, the terminal device further includes:

a second detection module, configured to, after the random access request is transmitted and before the TCI state is updated, perform detection for a power saving signal in a first search space based on a second QCL relationship, where the first search space is a search space for power saving signal transmission, the first search space is different from the recovery search space, and the second QCL relationship is a QCL relationship configured on a control resource set CORESET corresponding to the first search space.

Optionally, the first detection module is specifically configured to:

perform detection for the power saving signal in the recovery search space based on the first QCL relationship from a second occasion, where the second occasion is at least a first preset gap later than a first occasion, and the first occasion is a transmit occasion of the random access request.

Optionally, the terminal device further includes:

an execution module, configured to, in a case that the power saving signal is detected in the recovery search space, perform at least one of resetting a value of a beam failure counter to zero and stopping a failure recovery timer.

Optionally, the terminal device further includes:

a first wake-up module, configured to, after the random access request is transmitted, wake up in the OnDuration.

Optionally, the terminal device further includes a second transmitting module, configured to perform at least one of the following:

in a case that the power saving signal is detected, transmitting first feedback information; and in a case that no power saving signal is detected, transmitting second feedback information.

Optionally, the terminal device further includes:

a second wake-up module, configured to, in a case that no power saving signal is detected, wake up in the OnDuration and continue to transmit the random access request.

Optionally, the terminal device further includes:

a monitoring module, configured to, in a case that the OnDuration is woken up, monitor a control signal in the OnDuration.

Optionally, the terminal device further includes:

in a case that the TCI state is not updated and the detected power saving signal indicates sleeping, continue to perform detection for the power saving signal in the recovery search space based on the first QCL relationship.

Optionally, the terminal device further includes:

a third transmitting module, configured to, in a case that the TCI state is not updated and the detected power saving signal indicates sleeping, continue to transmit the random access request.

The terminal device 800 provided in this embodiment of this disclosure is capable of implementing all processes that are implemented by the terminal device in the foregoing method embodiment. To avoid repetition, details are not described herein again.

In the terminal device 800 according to this embodiment of this disclosure, the first transmitting module 801 is configured to, in a case that the beam failure is detected, transmit a random access request; the first detection module 802 is configured to, after the random access request is transmitted and before a transmission control indication TCI state is updated, perform detection for the power saving signal in a recovery search space based on a first quasi co-location QCL relationship, where the first QCL relationship is a QCL relationship of beam failure recovery reference signals BFR-RS. The power saving signal is transmitted in the beam failure recovery procedure, so that reception performance of the power saving signal can be improved in the case of poor beam signal quality, and further, consistency of understanding of the transmission and reception of the power saving signal on a network side and a UE side can be improved.

Figure 9:
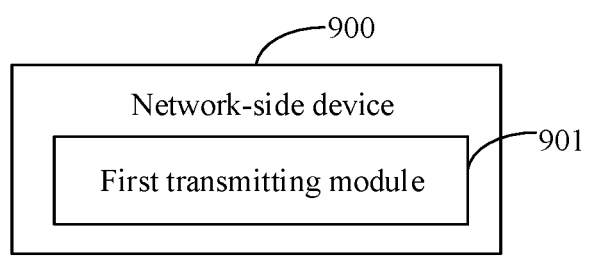
FIG. 9 is a structural diagram of a network-side device according to an embodiment of this disclosure.

Referring to FIG. 9, FIG. 9 is a structural diagram of a network-side device according to an embodiment of this disclosure. As shown in FIG. 9, the network-side device 900 includes:

a first transmitting module 901, configured to, in a case that a random access request is received at a random access occasion, transmit a power saving signal in a recovery search space, where the random access occasion has a QCL relationship with a beam failure recovery reference signal BFR-RS, and the power saving signal has a QCL relationship with the BFR-RS.

Optionally, the network-side device further includes:

a second transmitting module, configured to transmit a power saving signal in a first search space based on a second QCL relationship, where the first search space is a search space for power saving signal transmission, the first search space is different from the recovery search space, and the second QCL relationship is a QCL relationship configured on a control resource set CORESET corresponding to the first search space.

Optionally, the first transmitting module is specifically configured to:

transmit the power saving signal in the recovery search space from a third occasion, where the third occasion is at least a second preset gap later than a fourth occasion, and the fourth occasion is a receive occasion of the random access request.

Optionally, the power saving signal is used for indicating to wake up in the OnDuration.

Optionally, the network-side device further includes a receiving module, configured to perform at least one of the following:

receiving first feedback information, where the first feedback information is used for indicating that a terminal device has received the power saving signal; and receiving second feedback information, where the second feedback information is used for indicating that the terminal device has received no power saving signal.

The network-side device 900 provided in this embodiment of this disclosure is capable of implementing all processes that are implemented by the network-side device in the foregoing method embodiment. To avoid repetition, details are not described herein again.

In the network-side device 900 in this embodiment of this disclosure, the first transmitting module 901 is configured to, in a case that a random access request is received at a random access occasion, transmit a power saving signal in the recovery search space, where the random access occasion has a QCL relationship with a beam failure recovery reference signal BFR-RS, and the power saving signal has a QCL relationship with the BFR-RS. The power saving signal is transmitted in the beam failure recovery procedure, so that reception performance of the power saving signal can be improved in the case of poor beam signal quality, and further, consistency of understanding of the transmission and reception of the power saving signal on a network side and a UE side can be improved.

Figure 10:
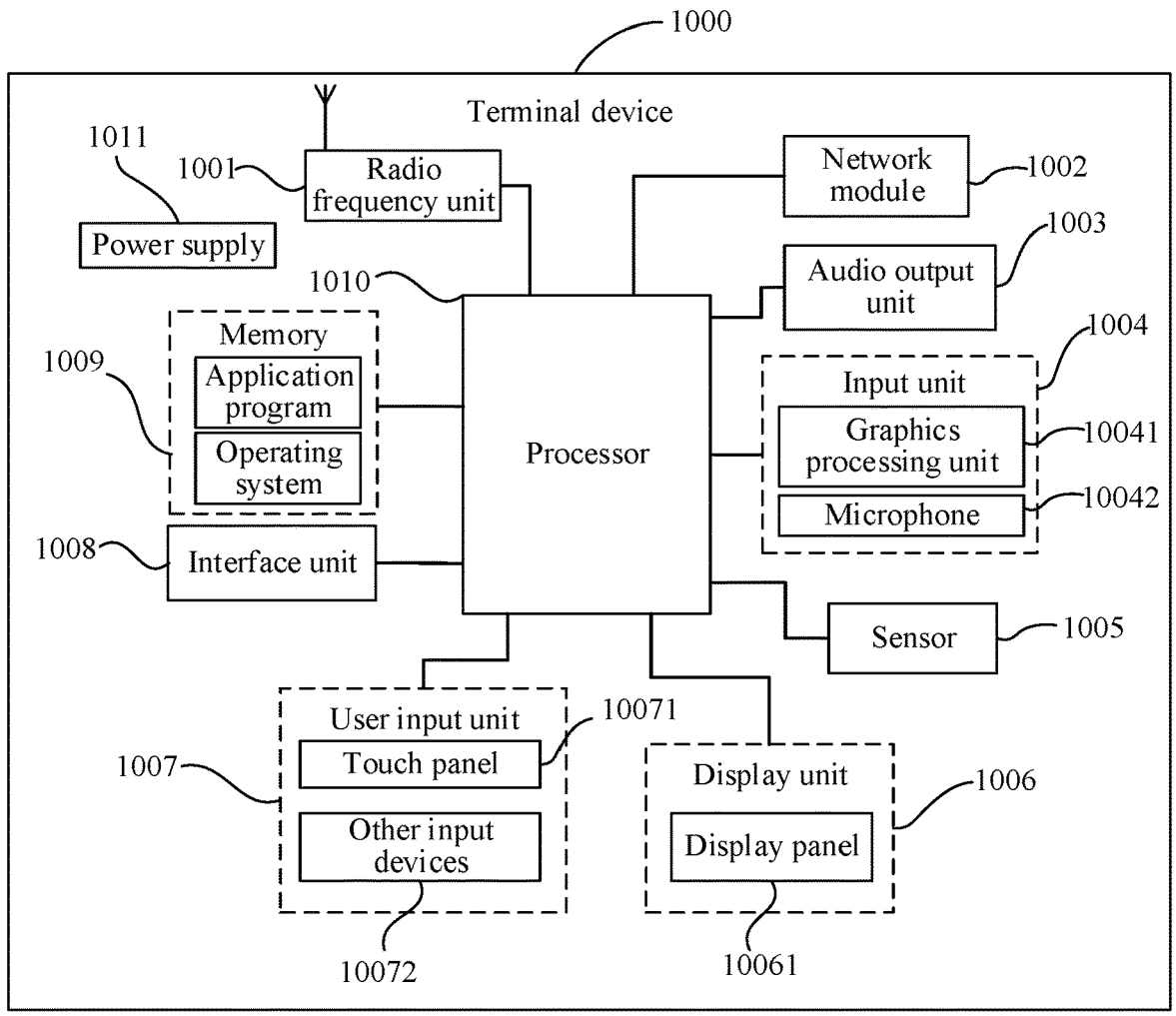
FIG. 10 is a structural diagram of a terminal device according to another embodiment of this disclosure.

FIG. 10 is a structural diagram of a terminal device according to another embodiment of this disclosure. Referring to FIG. 10, the terminal device 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, a processor 1010, and a power supply 1011. A person skilled in the art may understand that the terminal device is not limited to the terminal device structure shown in FIG. 10. The terminal device may include more or fewer components than those shown in the figure, or combine some of the components, or arrange the components differently. In this embodiment of this disclosure, the terminal device includes but is not limited to a mobile phone, a tablet computer, a laptop computer, a palmtop computer, an in-vehicle terminal, a wearable device, a pedometer, and the like.

The radio frequency unit 1001 is configured to, in a case that a beam failure is detected, transmit a random access request; the processor 1010 is configured to, after the random access request is transmitted and before a transmission control indication TCI state is updated, perform detection for a power saving signal in a recovery search space based on a first quasi co-location QCL relationship, where the first QCL relationship is a QCL relationship of beam failure recovery reference signals BFR-RS.

In this embodiment of this disclosure, the power saving signal is transmitted in the beam failure recovery procedure, so that reception performance of the power saving signal can be improved in the case of poor beam signal quality, and further, consistency of understanding of the transmission and reception of the power saving signal on a network side and a UE side can be improved.

Optionally, the processor 1010 is further configured to:

after the random access request is transmitted and before the TCI state is updated, perform detection for a power saving signal in a first search space based on a second QCL relationship, where the first search space is a search space for power saving signal transmission, the first search space is different from the recovery search space, and the second QCL relationship is a QCL relationship configured on a control resource set CORESET corresponding to the first search space.

Optionally, the processor 1010 is further configured to:

perform detection for the power saving signal in the recovery search space based on the first QCL relationship from a second occasion, where the second occasion is at least a first preset gap later than a first occasion, and the first occasion is a transmit occasion of the random access request.

Optionally, the processor 1010 is further configured to:

in a case that the power saving signal is detected in the recovery search space, perform at least one of resetting a value of a beam failure counter to zero and stopping a failure recovery timer.

Optionally, the processor 1010 is further configured to:

after the transmitting a random access request, wake up in the OnDuration.

Optionally, the processor 1010 is further configured to perform at least one of the following:

in a case that the power saving signal is detected, transmitting first feedback information; and in a case that no power saving signal is detected, transmitting second feedback information.

Optionally, the processor 1010 is further configured to:

in a case that no power saving signal is detected, wake up in the OnDuration and continue to transmit the random access request.

Optionally, the processor 1010 is further configured to:

in a case that the UE is woken up in the OnDuration, monitor a control signal in the OnDuration.

Optionally, the processor 1010 is further configured to:

in a case that the TCI state is not updated and the detected power saving signal indicates sleeping, continue to perform detection for the power saving signal in the recovery search space based on the first QCL relationship.

Optionally, the processor 1010 is further configured to:

in a case that the TCI state is not updated and the detected power saving signal indicates sleeping, continue to transmit the random access request.

It should be understood that, in this embodiment of this disclosure, the radio frequency unit 1001 may be configured to transmit and receive a signal in an information transmitting/receiving or call process. Specifically, the radio frequency unit 1001 receives downlink data from a base station and transmits the downlink data to the processor 1010 for processing; and transmits uplink data to the base station. Generally, the radio frequency unit 1001 includes but is not limited to an antenna, at least one amplifier, a transceiver, a coupler, a low noise amplifier, a duplexer, and the like. In addition, the radio frequency unit 1001 may also communicate with a network and other devices via a wireless communications system.

The terminal device provides wireless broadband Internet access for a user by using the network module 1002, for example, helping the user transmit and receive e-mails, browse web pages, and access streaming media.

The audio output unit 1003 may convert audio data into an audio signal, and output the audio signal as sound, where the audio data is received by the radio frequency unit 1001 or the network module 1002, or stored in the memory 1009. In addition, the audio output unit 1003 may further provide audio output (for example, a call signal received sound or a message received sound) that is related to a specific function performed by the terminal device 1000. The audio output unit 1003 includes a speaker, a buzzer, a receiver, and the like.

The input unit 1004 is configured to receive an audio or video signal. The input unit 1004 may include a graphics processing unit (GPU) 10041 and a microphone 10042, and the graphics processing unit 10041 processes image data of a still picture or a video obtained by an image capture apparatus (for example, a camera) in an image capture mode or a video capture mode. A processed image frame may be displayed on the display unit 1006. The image frame processed by the graphics processing unit 10041 may be stored in the memory 1009 (or another storage medium) or transmitted by using the radio frequency unit 1001 or the network module 1002. The microphone 10042 can receive sounds and process such sounds into audio data. The processed audio data can be converted in a telephone call mode into a format that can be transmitted by the radio frequency unit 1001 to a mobile communication base station, for outputting.

The terminal device 1000 further includes at least one sensor 1005, for example, an optical sensor, a motion sensor, and other sensors. Specifically, the optical sensor includes an ambient light sensor and a proximity sensor. The ambient light sensor may adjust luminance of a display panel 10061 based on brightness of ambient light. The proximity sensor may turn off and/or backlight of the display panel 10061 when the terminal device 1000 moves to an ear. As a motion sensor, an accelerometer sensor may detect magnitudes of an acceleration in various directions (usually three axes), may detect a magnitude and a direction of gravity when the terminal is static, and may be configured to recognize a posture of the terminal device (for example, landscape/portrait mode switching, a related game, or magnetometer posture calibration), provide a function related to vibration recognition (for example, a pedometer or a keystroke), or the like. The sensor 1005 may further include a fingerprint sensor, a pressure sensor, an iris sensor, a molecular sensor, a gyroscope, a barometer, a hygrometer, a thermometer, or an infrared sensor. Details are not described herein.

The display unit 1006 is configured to display information input by the user or information provided to the user. The display unit 1006 may include the display panel 10061. The display panel 10061 may be configured in a form of a liquid crystal display (LCD), an organic light-emitting diode (OLED), or the like.

The user input unit 1007 may be configured to receive entered numerical or character information, and generate key signal input that is related to user setting and function control of the terminal device. Specifically, the user input unit 1007 includes a touch panel 10071 and other input devices 10072. The touch panel 10071, or referred to as a touchscreen, may capture a touch operation performed by a user on or near the touch panel 10071 (for example, an operation performed by the user on the touch panel 10071 or near the touch panel 10071 by using any appropriate object or accessory such as a finger or a stylus). The touch panel 10071 may include two parts: a touch detection apparatus and a touch controller. The touch detection apparatus detects a touch direction of a user, detects a signal brought by a touch operation, and transmits the signal to the touch controller. The touch controller receives touch information from the touch detection apparatus, converts the touch information into touchpoint coordinates, transmits the touchpoint coordinates to the processor 1010, and receives and executes a command transmitted by the processor 1010. In addition, the touch panel 10071 may be implemented in a plurality of forms, for example, as a resistive, capacitive, infrared, or surface acoustic wave touch panel. In addition to the touch panel 10071, the user input unit 1007 may further include other input devices 10072. Specifically, the other input devices 10072 may include but are not limited to a physical keyboard, a function key (for example, a volume control key or a switch key), a trackball, a mouse, and a joystick. Details are not described herein.

Further, the touch panel 10071 may cover the display panel 10061. After detecting a touch operation on or near the touch panel 10071, the touch panel 10071 transmits the touch operation to the processor 1010 to determine a type of a touch event. Then the processor 1010 provides corresponding visual output on the display panel 10061 based on the type of the touch event. Although the touch panel 10071 and the display panel 10061 are used as two separate components to implement input and output functions of the terminal device in FIG. 10, the touch panel 10071 and the display panel 10061 may be integrated to implement the input and output functions of the terminal device in some embodiments. This is not specifically limited herein.

The interface unit 1008 is an interface for connecting an external apparatus to the terminal device 1000. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 1008 may be configured to receive input (for example, data information and electric power) from the external apparatus, and transmit the received input to one or more elements in the terminal device 1000; or may be configured to transmit data between the terminal device 1000 and the external apparatus.

The memory 1009 may be configured to store software programs and various data. The memory 1009 may mainly include a program storage area and a data storage area. The program storage area may store an operating system, an application program required for at least one function (for example, a sound play function and an image play function), and the like. The data storage area may store data created based on use of the mobile phone (for example, audio data and a phone book), and the like. In addition, the memory 1009 may include a high-speed random access memory, or may further include a non-volatile memory, for example, at least one magnetic disk storage device, a flash memory, or another volatile solid-state storage device.

The processor 1010 is a control center of the terminal device. The processor 1010 uses various interfaces and lines to connect all parts of the entire terminal device, and performs various functions and data processing of the terminal device by running or executing the software program and/or module stored in the memory 1009 and invoking data stored in the memory 1009, thereby performing overall monitoring on the terminal device. The processor 1010 may include one or more processing units. Optionally, the processor 1010 may integrate an application processor and a modem processor. The application processor mainly processes an operating system, a user interface, an application program, and the like. The modem processor mainly processes wireless communication. It can be understood that the modem processor may alternatively be not integrated in the processor 1010.

The terminal device 1000 may further include a power supply 1011 (for example, a battery) that supplies power to each component. Optionally, the power supply 1011 may be logically connected to the processor 1010 by using a power management system, so as to implement functions such as charging management, discharging management, and power consumption management by using the power management system.

In addition, the terminal device 1000 includes some functional modules that are not shown. Details are not described herein.

Optionally, an embodiment of this disclosure further provides a terminal device, including a processor 1010, a memory 1009, and a computer program stored in the memory 1009 and capable of running on the processor 1010. When the computer program is executed by the processor 1010, the processes of the foregoing embodiment of the method for receiving a power saving signal are implemented, with the same technical effects achieved. To avoid repetition, details are not described herein again.

Figure 11:
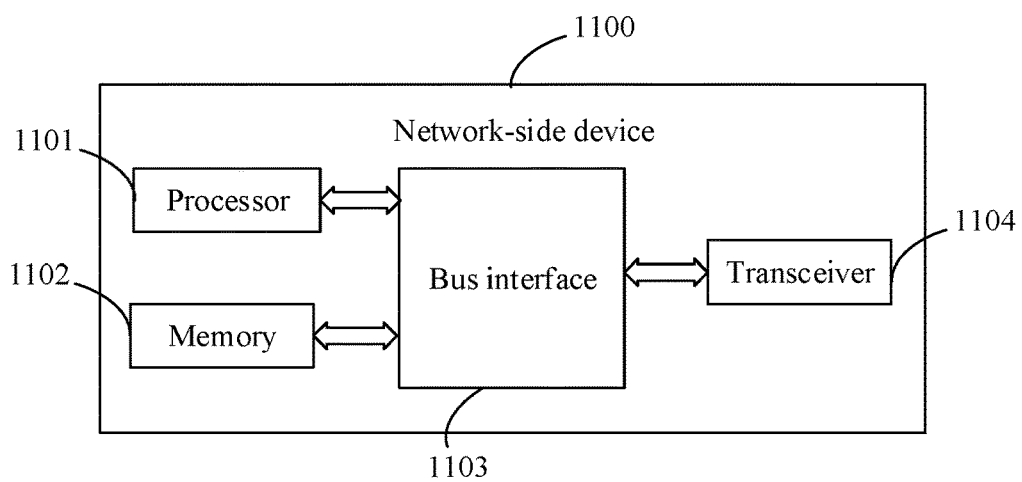
FIG. 11 is a structural diagram of a network-side device according to another embodiment of this disclosure.

Referring to FIG. 11, FIG. 11 is a structural diagram of a network-side device according to another embodiment of this disclosure. As shown in FIG. 11, the network-side device 1100 includes: a processor 1101, a memory 1102, a bus interface 1103, and a transceiver 1104, where the processor 1101, the memory 1102, and the transceiver 1104 are all connected to the bus interface 1103.

In this embodiment of this disclosure, the network-side device 1100 further includes a computer program stored in the memory 1102 and capable of running on the processor 1101.

In this embodiment of this disclose, the processor 1101 is configured to:

in a case that a random access request is received at a random access occasion, transmit a power saving signal in a recovery search space, where the random access occasion has a QCL relationship with a beam failure recovery reference signal BFR-RS, and the power saving signal has a QCL relationship with the BFR-RS.

Optionally, the processor 1101 is further configured to:

transmit a power saving signal in a first search space based on a second QCL relationship, where the first search space is a search space for power saving signal transmission, the first search space is different from the recovery search space, and the second QCL relationship is a QCL relationship configured on a control resource set CORESET corresponding to the first search space.

Optionally, the processor 1101 is further configured to:

transmit the power saving signal in the recovery search space from a third occasion, where the third occasion is at least a second preset gap later than a fourth occasion, and the fourth occasion is a receive occasion of the random access request.

Optionally, the power saving signal is used for indicating to wake up in the OnDuration.

Optionally, the processor 1101 is further configured to perform one of the following:

receiving first feedback information, where the first feedback information is used for indicating that a terminal device has received the power saving signal; and receiving second feedback information, where the second feedback information is used for indicating that the terminal device has received no power saving signal.

An embodiment of this disclosure further provides a computer-readable storage medium, where the computer-readable storage medium stores a computer program, and when the computer program is executed by the processor, the processes of the foregoing embodiment of the method for receiving a power saving signal or the foregoing embodiment of the method for transmitting a power saving signal can be implemented, with the same technical effects achieved. To avoid repetition, details are not described herein again. For example, the computer-readable storage medium is a read-only memory (ROM), a random access memory (RAM), a magnetic disk, or an optical disc.

It should be noted that in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

According to the description of the foregoing embodiments, persons skilled in the art can clearly understand that the method in the foregoing embodiments may be implemented by software in addition to a necessary universal hardware platform or by hardware only. In most cases, the former is a preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, a network device, or the like) to perform the methods described in the embodiments of this disclosure.

The foregoing describes the embodiments of this disclosure with reference to the accompanying drawings. However, this disclosure is not limited to the foregoing specific implementations. The foregoing specific implementations are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A method for receiving a power saving signal, applied to a terminal device and comprising:
   in a case that a beam failure is detected, transmitting a random access request; and
   after the random access request is transmitted and before a transmission control indication TCI state is updated, performing detection for a first power saving signal in a recovery search space based on a first quasi co-location QCL relationship, wherein the first power saving signal may be used to determine whether to wake up in OnDuration and the first QCL relationship is a QCL relationship of beam failure recovery reference signals BFR-RS.

2. The method according to claim 1, wherein the first power saving signal may be further used to determine whether the beam recovery is completed.

3. The method according to claim 1, further comprising:
after the random access request is transmitted, performing detection for a second power saving signal in a first search space based on a second QCL relationship, wherein
the first search space is a search space for transmission of the second power saving signal, the first search space is different from the recovery search space, and the second QCL relationship is a QCL relationship configured on a control resource set CORESET corresponding to the first search space.

4. The method according to claim 1, wherein the performing detection for a first power saving signal in a recovery search space based on a first quasi co-location QCL relationship comprises:
performing detection for the first power saving signal in the recovery search space based on the first QCL relationship from a second occasion, wherein
the second occasion is at least a first preset gap later than a first occasion, and the first occasion is a transmit occasion of the random access request.

5. The method according to claim 1, further comprising:
in a case that the first power saving signal is detected in the recovery search space, performing at least one of resetting a value of a beam failure counter to zero and stopping a failure recovery timer.

6. The method according to claim 5, further comprising:
after the transmitting a random access request, waking up in the OnDuration.

7. The method according to claim 1, further comprising:
in a case that no first power saving signal is detected, waking up in the OnDuration and continuing to transmit the random access request.

8. The method according to claim 7, further comprising:
in a case that the OnDuration is woken up, monitoring a control signal in the OnDuration.

9. A terminal device, comprising a processor, a memory, and a computer program stored in the memory and capable of running on the processor, wherein when the computer program is executed by the processor, the steps of the method for receiving a power saving signal are implemented, wherein the method comprises:
in a case that a beam failure is detected, transmitting a random access request; and
after the random access request is transmitted and before a transmission control indication TCI state is updated, performing detection for a first power saving signal in a recovery search space based on a first quasi co-location QCL relationship, wherein the first power saving signal may be used to determine whether to wake up in OnDuration and the first QCL relationship is a QCL relationship of beam failure recovery reference signals BFR-RS.

10. The terminal device according to claim 9, wherein the first power saving signal may be further used to determine whether the beam recovery is completed.

11. The terminal device according to claim 9, further comprising:
after the random access request is transmitted, performing detection for a second power saving signal in a first search space based on a second QCL relationship, wherein
the first search space is a search space for transmission of the second power saving signal, the first search space is different from the recovery search space, and the second QCL relationship is a QCL relationship configured on a control resource set CORESET corresponding to the first search space.

12. The terminal device according to claim 9, wherein the performing detection for a first power saving signal in a recovery search space based on a first quasi co-location QCL relationship comprises:
performing detection for the first power saving signal in the recovery search space based on the first QCL relationship from a second occasion, wherein
the second occasion is at least a first preset gap later than a first occasion, and the first occasion is a transmit occasion of the random access request.

13. The terminal device according to claim 9, further comprising:
in a case that the first power saving signal is detected in the recovery search space, performing at least one of resetting a value of a beam failure counter to zero and stopping a failure recovery timer.

14. The terminal device according to claim 13, further comprising:
after the transmitting a random access request, waking up in the OnDuration.

15. The method according to claim 9, further comprising:
in a case that no first power saving signal is detected, waking up in the OnDuration and continuing to transmit the random access request.

16. The terminal device according to claim 15, further comprising:
in a case that the OnDuration is woken up, monitoring a control signal in the OnDuration.

17. A non-transitory computer-readable storage medium, wherein the computer-readable storage medium stores a computer program, and when the computer program is executed by a processor, the steps of the method for receiving a power saving signal are implemented, wherein the method comprises:
in a case that a beam failure is detected, transmitting a random access request; and
after the random access request is transmitted and before a transmission control indication TCI state is updated, performing detection for a first power saving signal in a recovery search space based on a first quasi co-location QCL relationship, wherein the first power saving signal may be used to determine whether to wake up in OnDuration and the first QCL relationship is a QCL relationship of beam failure recovery reference signals BFR-RS.

18. The non-transitory computer-readable storage medium according to claim 17, wherein the first power saving signal may be further used to determine whether the beam recovery is completed.

19. The non-transitory computer-readable storage medium according to claim 17, further comprising:
after the random access request is transmitted, performing detection for a second power saving signal in a first search space based on a second QCL relationship, wherein
the first search space is a search space for transmission of the second power saving signal, the first search space is different from the recovery search space, and the second QCL relationship is a QCL relationship configured on a control resource set CORESET corresponding to the first search space.

20. The non-transitory computer-readable storage medium according to claim 17, wherein the performing detection for a first power saving signal in a recovery search space based on a first quasi co-location QCL relationship comprises:
    performing detection for the first power saving signal in the recovery search space based on the first QCL relationship from a second occasion, wherein
    the second occasion is at least a first preset gap later than a first occasion, and the first occasion is a transmit occasion of the random access request.

\* \* \* \* \*